April 11, 1939.  N. B. BACH  2,153,607
APPARATUS FOR CLARIFYING LIQUORS CONTAINING SUSPENDED AND FLOCCULENT
MATTER, SUCH AS SUGAR JUICES, AND SIMILAR LIQUORS
Filed May 19, 1938
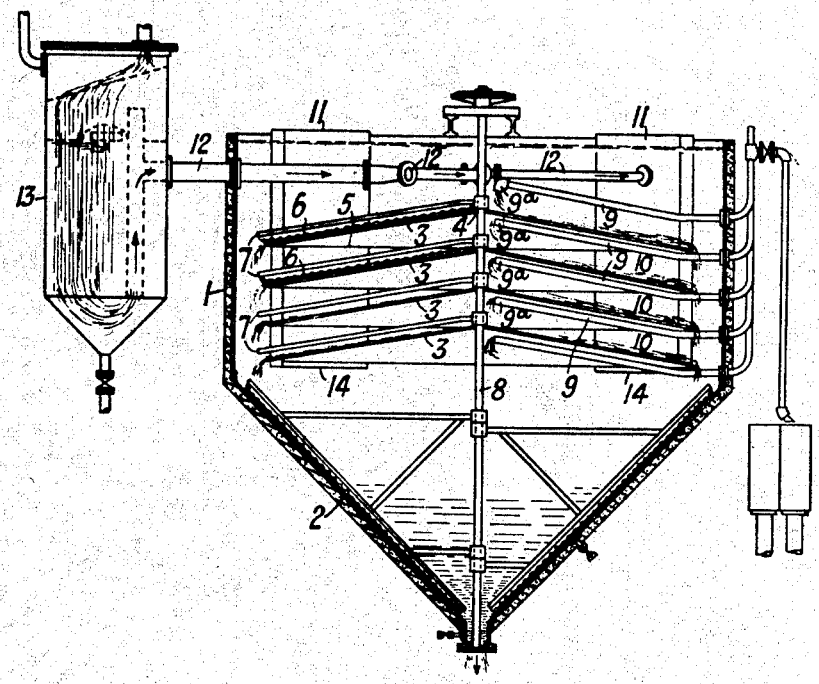
Inventor
Niels Breinholt Bach
By Pennie Davis Marvin Edmonds
Attorneys Patented Apr. 11, 1939

2,153,607

UNITED STATES PATENT OFFICE 2,153,607

APPARATUS FOR CLARIFYING LIQUORS CONTAINING SUSPENDED AND FLOCCULENT MATTER, SUCH AS SUGAR JUICES, AND SIMILAR LIQUORS

Niels Breinholt Bach, Vestervig, Denmark

Application May 19, 1938, Serial No. 208,818
In Great Britain July 14, 1937

1 Claim. (Cl. 210—55)

This invention relates to apparatus for clarifying liquors containing suspended and flocculent matter, such as sugar juices and similar liquors. For convenience of description, the invention is treated as applicable to apparatus for clarifying sugar juices.

The invention is particularly concerned with that type of apparatus which includes a cylindrical tank having a conical base and a series of conical trays arranged in superposed spaced relationship within and co-axially with the tank, means for introducing juices to be clarified into the tank and means for withdrawing clarified juices from the tank.

The invention consists in the incorporation in apparatus of the type described of improved means for introducing juice into the tank comprising a plurality of chambers in communication with the source of juice supply and mounted in spaced relationship around the tank wall, with the main delivery outlets at their bases so that the muds and the juices flow in counter-current.

An apparatus constructed in accordance with the invention is illustrated in the figure of the accompanying drawing which is a vertical section.

The apparatus shown includes a cylindrical tank 1 having a steeply inclined conical base 2 and a series of conical trays 3 arranged in superposed spaced relationship within and coaxially with the tank 1.

The trays 3 are arranged with their apexes 4 disposed above their peripheries 5 so that the muds are constrained to flow across their upper surfaces towards the peripheries, scrapers 6 constituted as chains loosely suspended from arms 7 on a rotary shaft 8 being arranged to sweep said surfaces. A set of draw-off pipes 9, one for each compartment 10 bounded by adjacent trays, one located above the uppermost tray, and one below the lowermost tray, are arranged with their inlets 9a in the region of the apexes 4. It will be readily understood that the zones of optimum clarity are in the region of the apexes. The peripheries of the trays 3 are spaced from the cylindrical wall of the tank 1 so that muds may flow from the peripheries to the tank base. At their apexes the trays are slightly spaced from the shaft 8 so that gases may flow upwardly through the apexes.

For introducing juice to the tank 1 there are provided a plurality of chambers 11 in communication, by means of pipes 12, with the source of juice supply, constituted as a flash tank 13, and mounted in spaced relationship around the tank wall. The main delivery outlets from the chambers are at their bases 14. Supplementary outlets may be arranged approximately midway between their bases and their upper ends.

What is claimed is:

Apparatus for clarifying sugar juices, comprising, in combination, a cylindrical tank having a conical base, a series of conical trays arranged in superposed spaced relationship within and co-axially with said tank, with their apexes disposed above their peripheries, a series of draw-off pipes, at least one for each of said trays, arranged with their inlets in the zones of optimum clarity in the region of said apexes, and means for introducing juice to be clarified into said tank including a plurality of chambers mounted in spaced relationship around the wall of said tank with the main delivery outlets at their bases.

NIELS BREINHOLT BACH.